US012601226B2

(12) United States Patent
Banditrat

(10) Patent No.: US 12,601,226 B2
(45) Date of Patent: Apr. 14, 2026

(54) TUBULAR MEMBER WITH ASYMMETRIC BURST AND COLLAPSE RATINGS, METHOD, AND SYSTEM

(71) Applicant: Baker Hughes Oilfield Operations LLC, Houston, TX (US)

(72) Inventor: Thomas Banditrat, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 443 days.

(21) Appl. No.: 18/187,893

(22) Filed: Mar. 22, 2023

(65) Prior Publication Data

US 2024/0318509 A1 Sep. 26, 2024

(51) Int. Cl.
 *E21B 17/00* (2006.01)
 *F16L 9/00* (2006.01)
(52) U.S. Cl.
 CPC .............. *E21B 17/00* (2013.01); *F16L 9/006* (2013.01)
(58) Field of Classification Search
 CPC ... F16L 9/006; F16L 9/12; F16L 9/133; F16L 9/18; F16L 11/20; F16L 9/21; F16L 55/02727; F16L 55/02736; E21B 17/00; E21B 17/20; E21B 43/103; E21B 43/108
 USPC ....................................................... 138/119
 See application file for complete search history.

(56) References Cited

U.S. PATENT DOCUMENTS

| | | | | | |
|---|---|---|---|---|---|
| 3,053,283 | A | * | 9/1962 | Milford ..................... | F16L 9/18 |
| | | | | | 165/154 |
| 3,379,221 | A | * | 4/1968 | Harry ......................... | F16L 9/18 |
| | | | | | 428/117 |
| 3,552,779 | A | * | 1/1971 | Henderson .............. | E21B 17/18 |
| | | | | | 285/123.3 |
| 3,974,862 | A | * | 8/1976 | Fuhrmann ................. | F16L 9/21 |
| | | | | | 138/37 |
| 5,433,252 | A | * | 7/1995 | Wolf ......................... | F16L 7/00 |
| | | | | | 285/123.1 |
| 2005/0276945 | A1 | * | 12/2005 | Muggli ............... | B29C 37/0082 |
| | | | | | 428/119 |
| 2012/0031616 | A1 | * | 2/2012 | Hall .......................... | F16L 9/18 |
| | | | | | 138/148 |
| 2017/0336000 | A1 | * | 11/2017 | VanHoose ............... | F16L 11/15 |

* cited by examiner

*Primary Examiner* — David Bochna
(74) *Attorney, Agent, or Firm* — Baker Hughes Patent Organization

(57) ABSTRACT

A tubular member with asymmetric burst and collapse ratings, including a first wall of the tubular member, a second wall of the tubular member spaced from the first wall, a fixed support extending from the first wall toward the second wall, and a dual-action support extending from the second wall toward the first wall. A method for maintaining standard tubular dimensions while achieving asymmetric burst and collapse ratings including exposing the tubular member to pressure from one of the first or second walls, and supporting or failing to support the tubular member depending upon an orientation of the support and the dual-action support. A borehole system, including a borehole in a subsurface formation, a string in the borehole, and a tubular member with asymmetric burst and collapse ratings disposed within or as a part of the string.

20 Claims, 7 Drawing Sheets

TUBULAR MEMBER WITH ASYMMETRIC BURST AND COLLAPSE RATINGS, METHOD, AND SYSTEM

BACKGROUND

In the resource recovery and fluid sequestration industries, there are needs related to burst and collapse ratings of tubular members. Traditionally, these are adjusted by selecting a member for the need based upon its inherent structural properties or based upon the dimensions of the tubular members or both. This is problematic when considering that it is often undesirable to change structural properties just to get a rating that is needed and it is always problematic to change dimensions of tubular members that are generally intended to be more or less standardized so that interactions with other well tools is predictable. The art would therefore well receive alternatives that allow for asymmetric burst and collapse ratings without the drawbacks inherent in the prior art methodologies.

SUMMARY

An embodiment of a tubular member with asymmetric burst and collapse ratings, including a first wall of the tubular member, a second wall of the tubular member spaced from the first wall, a fixed support extending from the first wall toward the second wall, and a dual-action support extending from the second wall toward the first wall.

An embodiment of a method for maintaining standard tubular dimensions while achieving asymmetric burst and collapse ratings including exposing the tubular member to pressure from one of the first or second walls, and supporting or failing to support the tubular member depending upon an orientation of the support and the dual-action support.

A borehole system, including a borehole in a subsurface formation, a string in the borehole, and a tubular member with asymmetric burst and collapse ratings disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
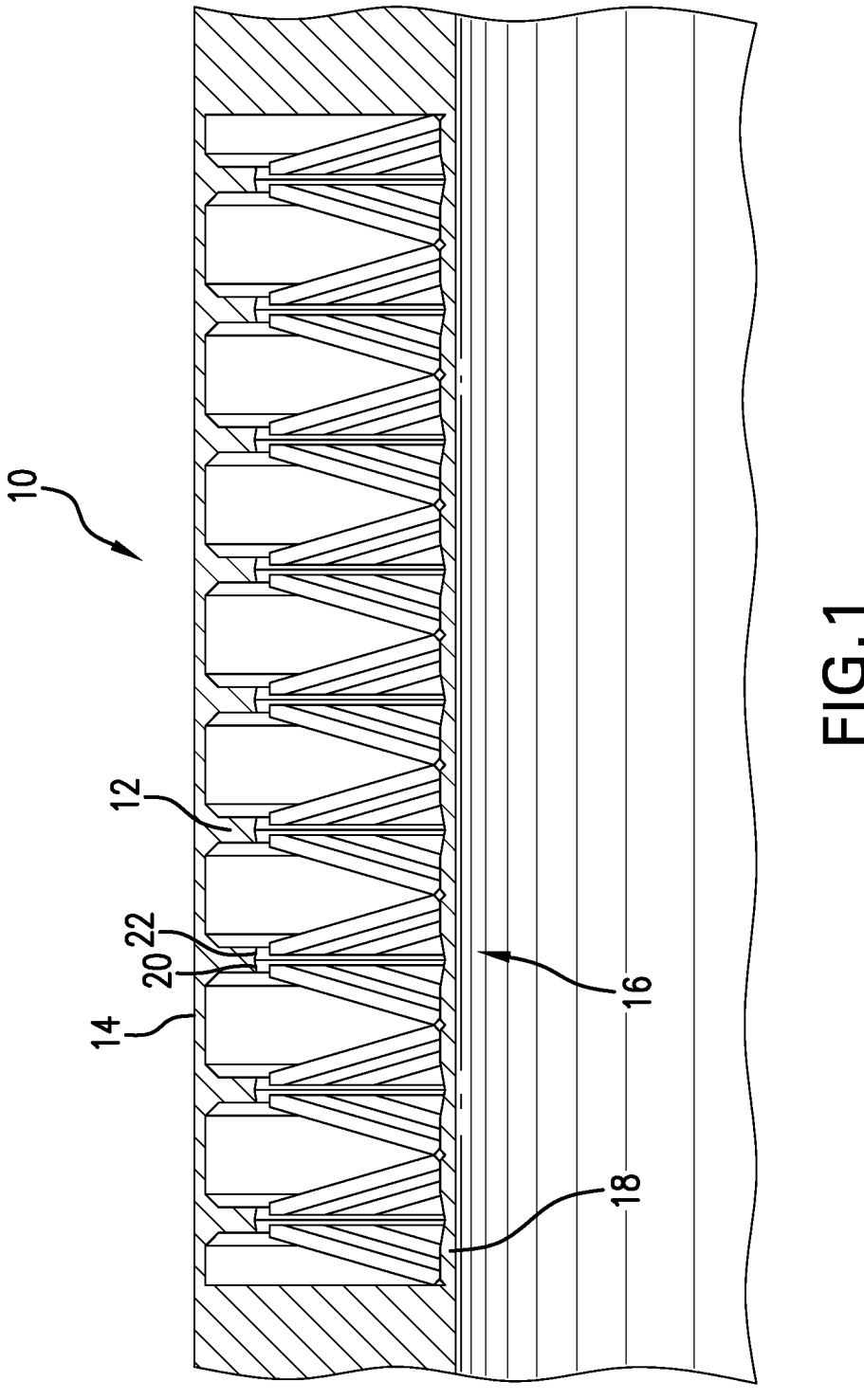
FIG. 1 is a sectional view of a portion of tubular member with asymmetric burst and collapse ratings.
Figure 2:
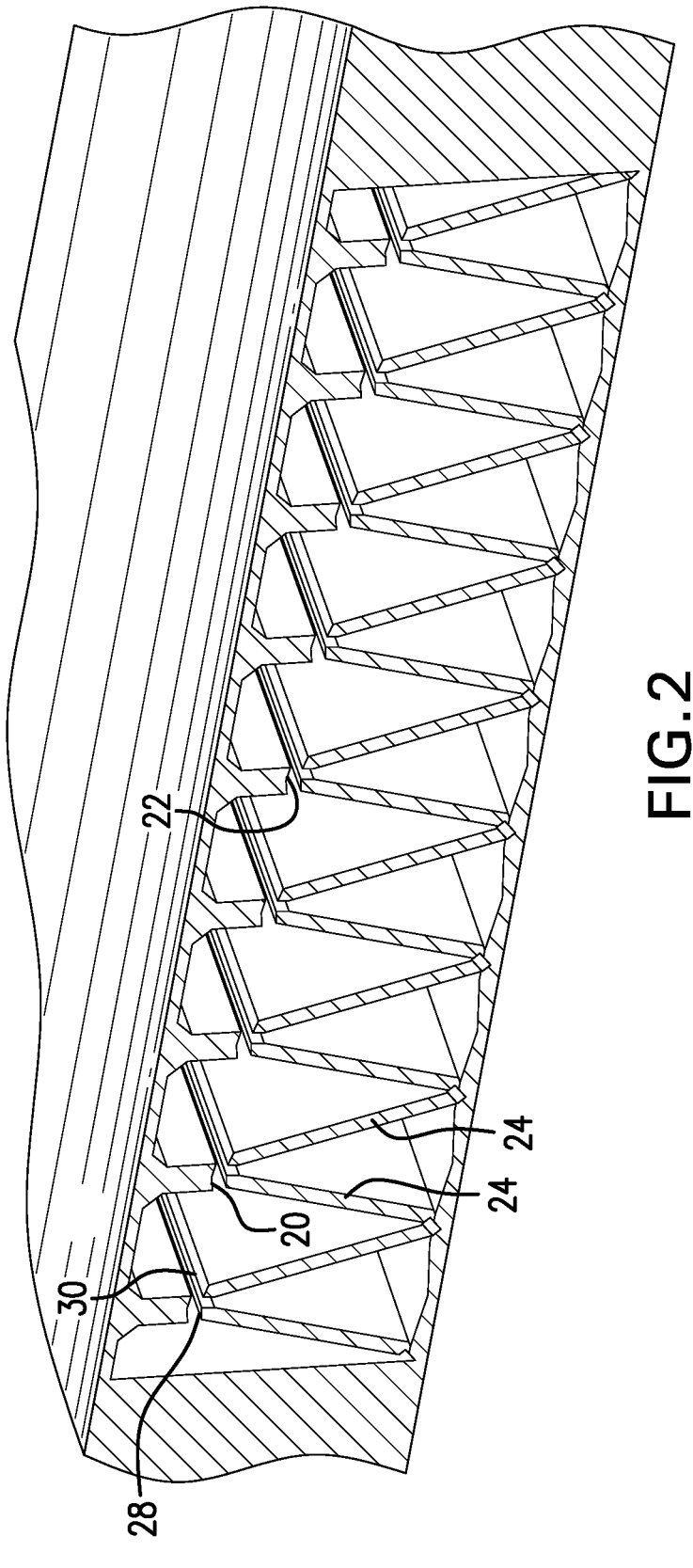
FIG. 2 is a perspective view of the tubular member of FIG. 1.
Figure 3:
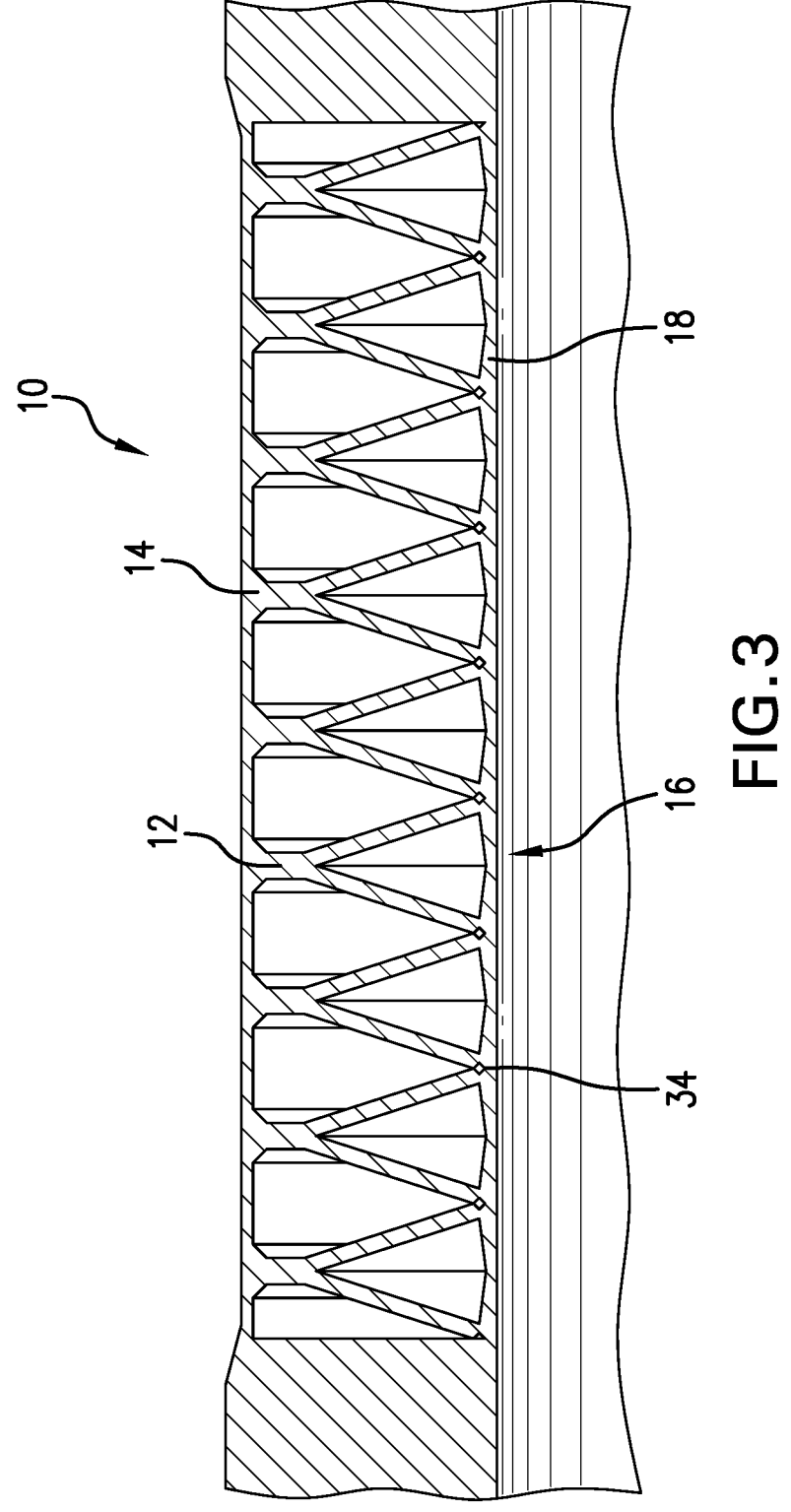
FIG. 3 is the view of FIG. 1 with a pressure applied to a first wall of the tubular member.

Referring to FIGS. 1 and 2, a tubular member 10 is illustrated. The member 10 provides asymmetric burst and collapse ratings based upon an alignment or misalignment of a fixed support 12 extending from a first wall 14 and a dual-action support 16 extending from a second wall 18. It will be appreciated in FIGS. 1 and 2 that the fixed support 12 is not in contact with the dual-action support 16 when the member 10 is at rest in atmospheric pressure or otherwise relatively low pressure. Upon the application of higher relative pressure acting on the first wall 14 than on the second wall 18, and referring to FIG. 3, the fixed support 12 is urged toward the second wall 18 and into contact with the dual-action support 16, whereby the first wall 14 is supported. The supportive action is assisted by faces 20 and 22 of the fixed support 12 that are disposed at an obtuse angle relative to each other. Further, the dual-action support 16 includes two stanchions 24 in an A frame configuration, the stanchions having ends 28 and 30 that are angled in a complementary manner to the faces 20 and 22 to nest securely therewith. Faces 20 and 22 tend to capture ends 28 and 30 of the dual-action support 16 when the fixed support 12 is driven thereagainst by pressure exerted against the first wall 14 and thereby the faces and ends ensure that the collective support structure 12/16 will remain in place and supportive. The supported condition is illustrated in FIG. 3. Because of the supportive structure, the rating of the member 10 for pressure exerted on the first wall 14 is similar to what it would be for a solid tubular member of the prior art.

It should be appreciated that while the first wall 14 is illustrated as a radially outer wall of the tubular member 10, the structures may be reversed such that the first wall 14 would be a radially inner wall of the tubular member 10. More specifically, the reader should understand that the fixed support 12 and the dual-action support 16 could be flipped over to make the first wall the inside of the tubular member and the second wall the outside of the tubular member 10 so that the burst rating would be higher than the collapse rating, in that case.

It should also be understood that groups of supports (each a pair of a fixed and a dual-action) may be spaced out along the tubular member and may all be oriented in the same direction or the reverse direction so that multiple zones of the tubular member 10 may have configured burst and/or collapse ratings as needed for particular operations with which that section of tubular member 10 will be associated.

Figure 4:
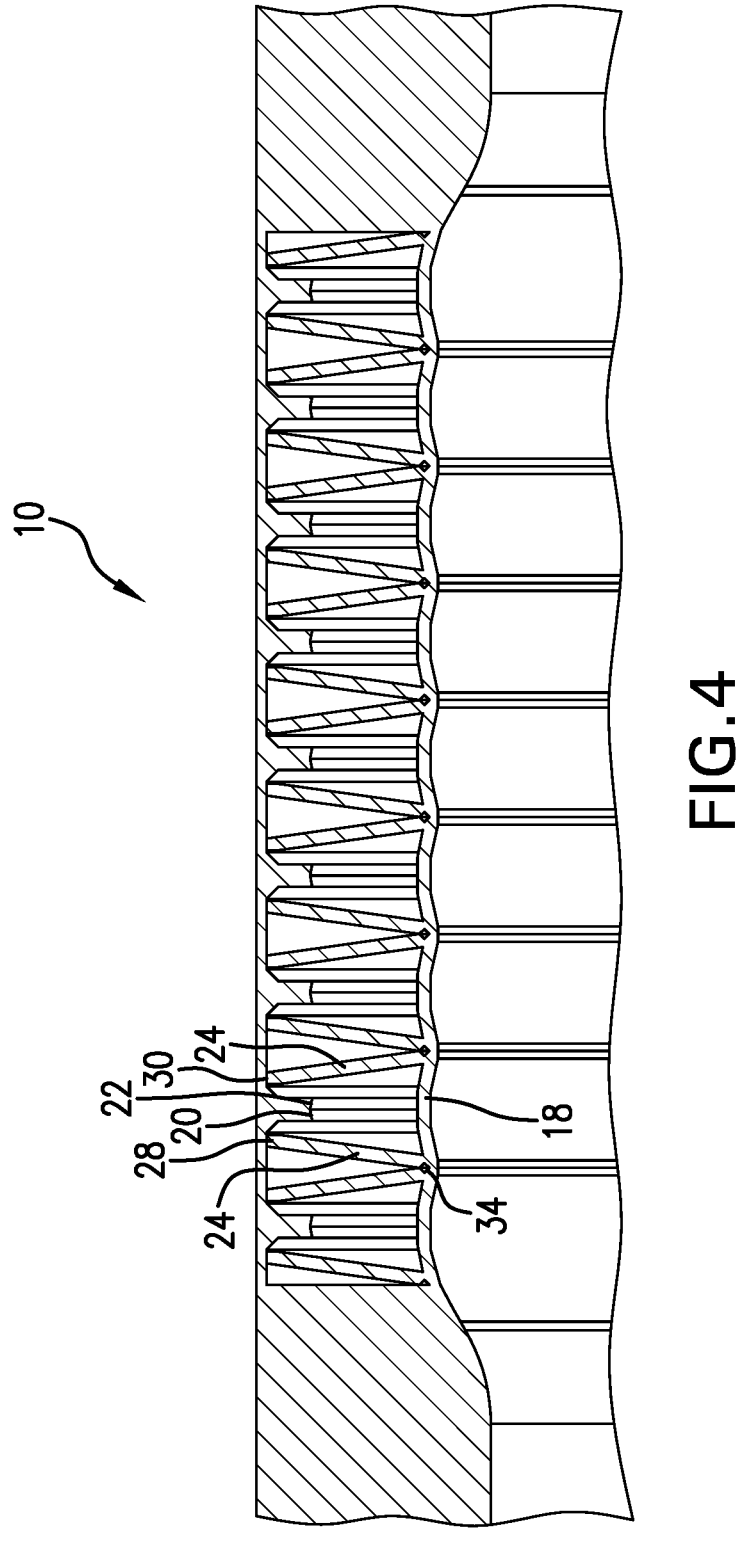
FIG. 4 is the view of FIG. 1 with a pressure applied to a second wall of the tubular member.
Figure 5:
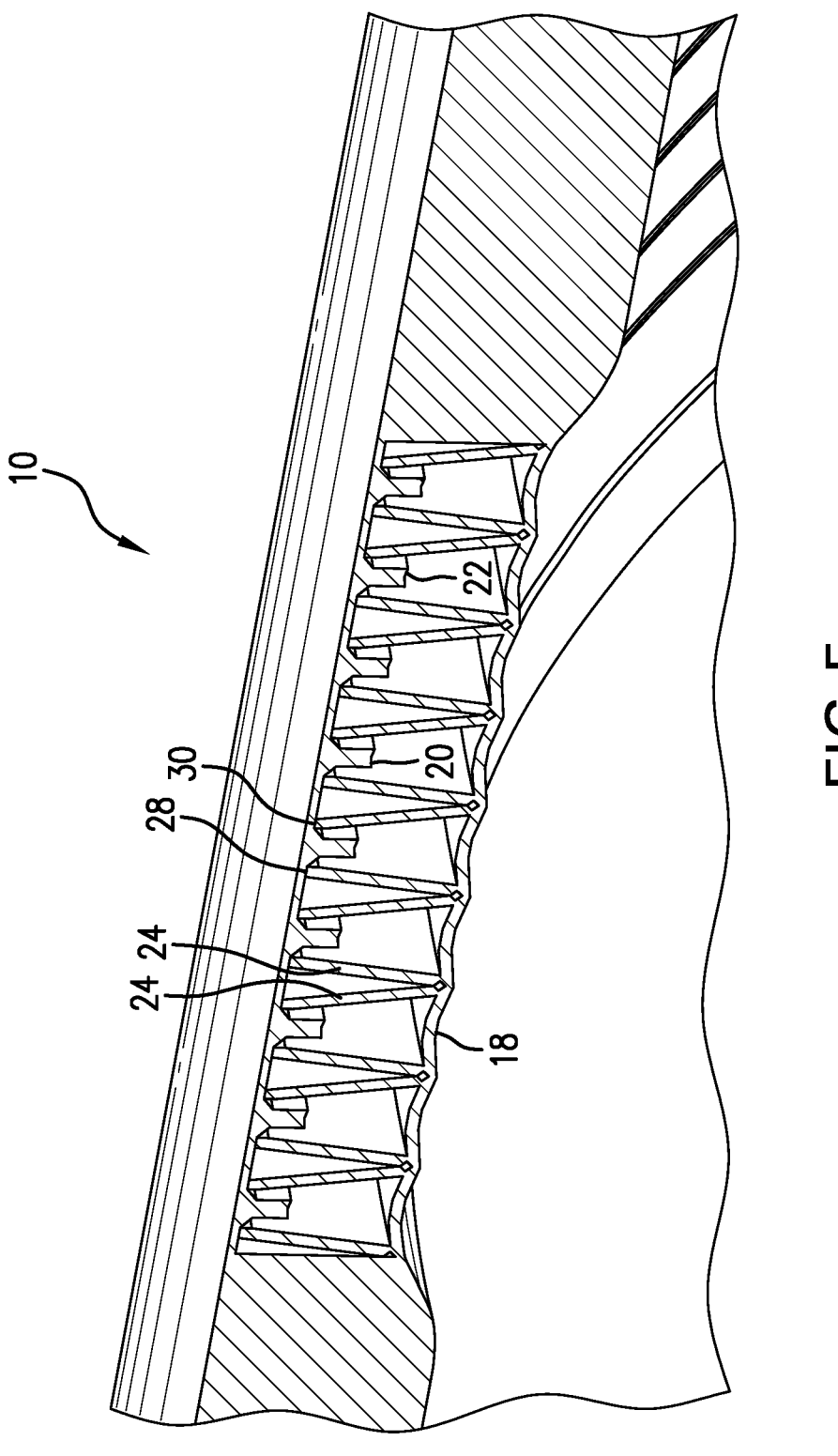
FIG. 5 is a perspective view of FIG. 4.

Turning to FIGS. 4 and 5, the member 10 is illustrated where pressure is applied from the second wall 18 (again, this is illustrated with the second wall on the inside but it could be on the outside). It will be appreciated that the second wall 18 bows between the stanchions 24 causing the stanchions 24 to deflect out of alignment with the fixed support 12. When deflected, one stanchion 24 will be located on each side of fixed support 12. Because the support structure of the fixed support 12 and dual-action support 16 are not aligned, the rating of the tubular will be significantly lower than it would be for a similarly sized traditional tubular member. Hence, the burst pressure as illustrated (or collapse pressure if the parts were reversed in orientation) will be lower. In some embodiments a clearance groove 34 may be disposed between adjacent dual-action supports 16 to aid in the stanchions 24 deflecting upon pressure application to the second wall 18.

Figure 6:
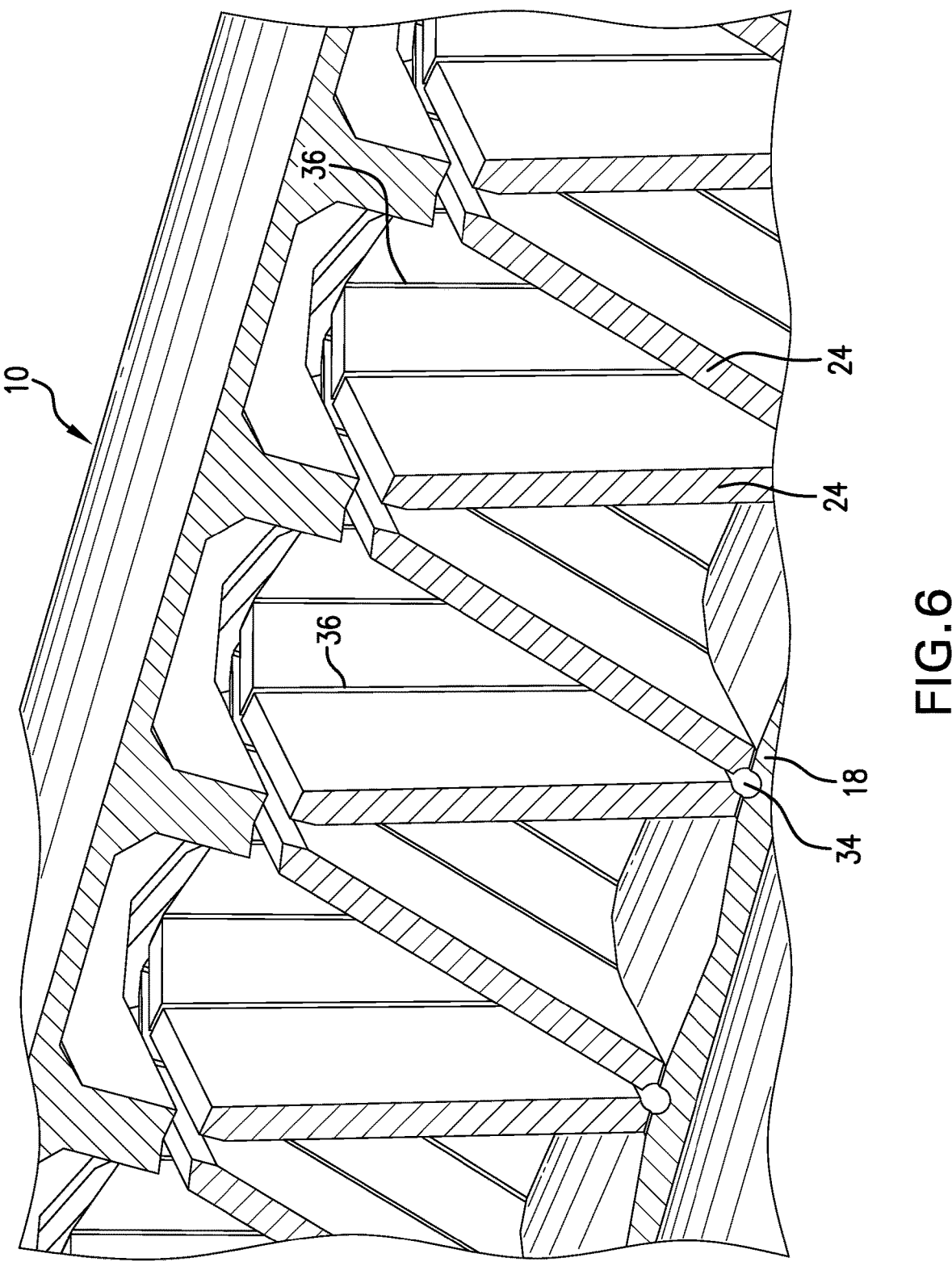
FIG. 6 is a perspective view similar to FIG. 2 but enlarged to a greater extent to illustrate radial slots.

Referring to FIG. 6, it will be appreciated that a number of radially oriented slots 36 are disposed through the stanchions 24. It will be appreciated that each stanchion 24 is essentially a ring of material that is oriented nearly orthogonally relative to a longitudinal axis of the tubular member 10. The stanchions 24 are required to grow radially into contact with the first wall 14, bypassing the fixed supports 12, upon pressure against second wall 18. While it is possible for the stanchions to grow sufficiently by stretching, the embodiment of FIG. 6 makes the radial growth easier by providing the slots 36 that will open upon the radial growth. One or more of the slots 36 is contemplated in one or more of the stanchions 24.

Figure 7:
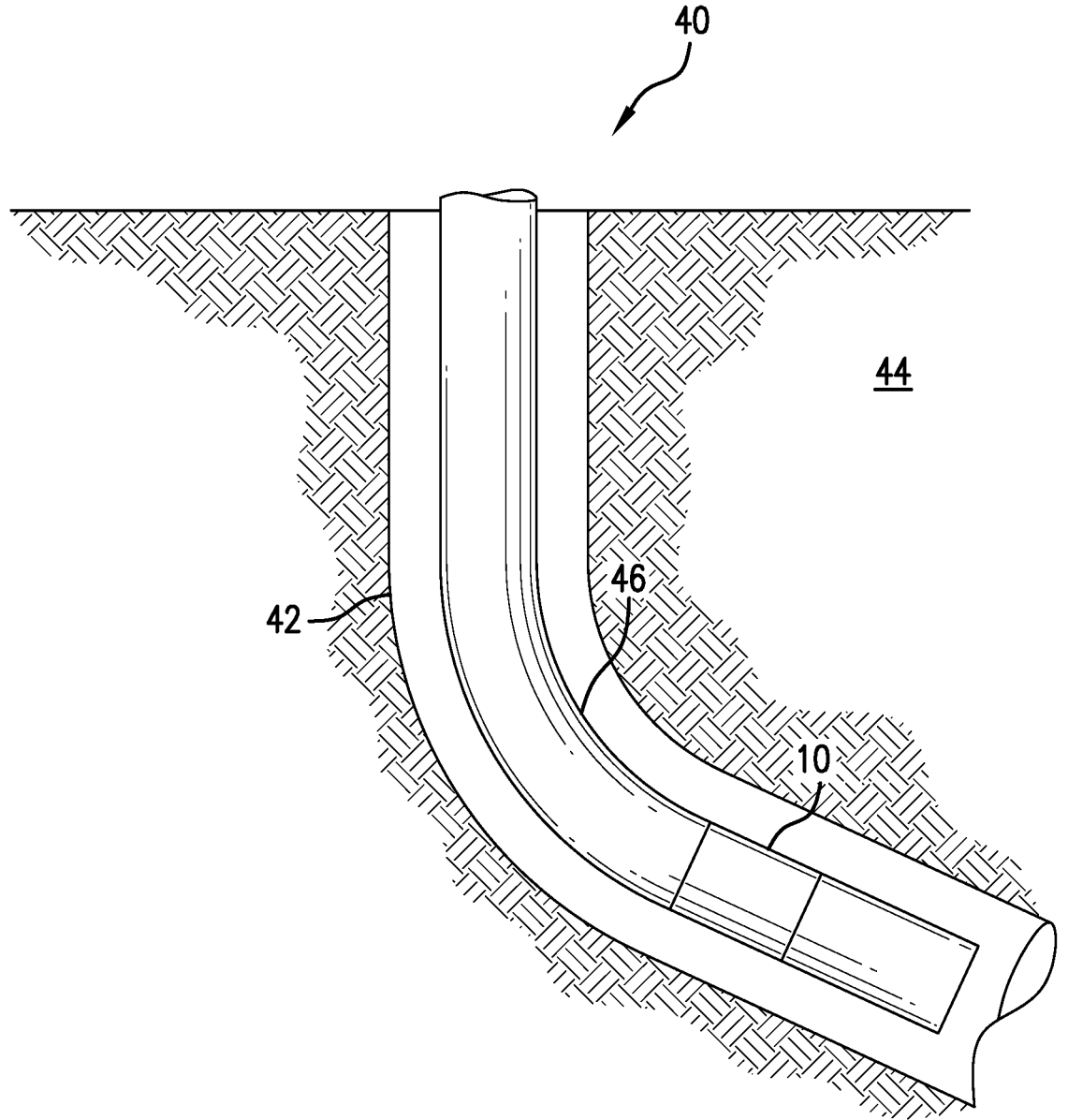
FIG. 7 is a view of a borehole system including a tubular member with asymmetric burst and collapse ratings as disclosed herein.

Referring to FIG. 7, a borehole system 40 is illustrated. The system 40 comprises a borehole 42 in a subsurface formation 44. A string 46 is disposed within the borehole 42. A tubular member 10 with asymmetric burst and collapse ratings as disclosed herein is disposed within or as a part of the string 46.

Set forth below are some embodiments of the foregoing disclosure:

Embodiment 1: A tubular member with asymmetric burst and collapse ratings, including a first wall of the tubular member, a second wall of the tubular member spaced from the first wall, a fixed support extending from the first wall toward the second wall, and a dual-action support extending from the second wall toward the first wall.

Embodiment 2: The member as in any prior embodiment, wherein the fixed support includes a termination having two faces at an obtuse angle to each other.

Embodiment 3: The member as in any prior embodiment, wherein the faces are configured to engage the dual-action support when the fixed support is moved toward the dual-action support.

Embodiment 4: The member as in any prior embodiment, wherein the dual-action support includes faces having an angle complementary to the faces of the termination.

Embodiment 5: The member as in any prior embodiment, wherein pressure on the first wall results in the fixed support engaging the dual-action support thereby supporting the first wall against the pressure acting thereon, during use.

Embodiment 6: The member as in any prior embodiment, wherein the dual-action support opens when moved toward the fixed support.

Embodiment 7: The member as in any prior embodiment, wherein pressure on the second wall results in the dual-action support opening and therefore not engaging the fixed support thereby failing to support the second wall against the pressure acting thereon, during use.

Embodiment 8: The member as in any prior embodiment, wherein the dual-action support comprises a plurality of stanchions operating in concert.

Embodiment 9: The member as in any prior embodiment, wherein one or more of the plurality of stanchions includes one or more slots.

Embodiment 10: The member as in any prior embodiment, wherein the dual action support is a plurality of supports arranged along a longitudinal direction of the tubular member.

Embodiment 11: The member as in any prior embodiment, wherein the fixed support is a plurality of supports arranged along a longitudinal direction of the tubular member.

Embodiment 12: The member as in any prior embodiment, wherein a greater pressure may be borne from the first wall than from the second wall.

Embodiment 13: The member as in any prior embodiment, wherein the first wall is a radially outer wall of the tubular.

Embodiment 14: The member as in any prior embodiment, wherein the first wall is a radially inner wall of the tubular.

Embodiment 15: The member as in any prior embodiment, wherein a plurality of groups of fixed supports and dual-action supports are spaced along a longitudinal direction of the tubular member.

Embodiment 16: The member as in any prior embodiment, wherein each group of the plurality of groups has the same orientation.

Embodiment 17: The member as in any prior embodiment, wherein one or more groups of the plurality of groups has an orientation that is opposite one or more other groups of the plurality of groups.

Embodiment 18: A method for maintaining standard tubular dimensions while achieving asymmetric burst and collapse ratings including exposing the tubular member as claimed in claim 1 to pressure from one of the first or second walls, and supporting or failing to support the tubular member depending upon an orientation of the support and the dual-action support.

Embodiment 19: The method as in any prior embodiment wherein when pressure is applied to the first or second wall on which the dual-action support is located, the method includes flexing the wall and causing the dual-action support to splay, thereby misaligning the dual-action support with the fixed support.

Embodiment 20: A borehole system, including a borehole in a subsurface formation, a string in the borehole, and a tubular member with asymmetric burst and collapse ratings as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" includes a range of +8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A tubular member with asymmetric burst and collapse ratings, comprising:
a first wall of the tubular member;
a second wall of the tubular member spaced from the first wall;
a fixed support extending from the first wall toward the second wall; and
a dual-action support extending from the second wall toward the first wall, the dual action support aligning with the fixed support upon pressure acting on the first wall and misaligning with the fixed support upon pressure acting on the second wall.

2. The member as claimed in claim 1, wherein the fixed support includes a termination having two faces at an obtuse angle to each other.

3. The member as claimed in claim 2, wherein the faces are configured to engage the dual-action support when the fixed support is moved toward the dual-action support.

4. The member as claimed in claim 2, wherein the dual-action support includes faces having an angle complementary to the faces of the termination.

5. The member as claimed in claim 1, wherein pressure on the first wall results in the fixed support engaging the dual-action support thereby supporting the first wall against the pressure acting thereon, during use.

6. The member as claimed in claim 1, wherein the dual-action support misalignment occurs when the dual action support is moved toward the fixed support.

7. The member as claimed in claim 1, wherein the misaligning of the dual-action support results in the dual-action support not engaging the fixed support, thereby failing to support the second wall against the pressure acting thereon, during use.

8. The member as claimed in claim 1, wherein the dual-action support comprises a plurality of stanchions operating cooperatively.

9. The member as claimed in claim 8, wherein one or more of the plurality of stanchions includes one or more slots.

10. The member as claimed in claim 1, wherein the dual action support is a plurality of supports arranged along a longitudinal direction of the tubular member.

11. The member as claimed in claim 1, wherein the fixed support is a plurality of supports arranged along a longitudinal direction of the tubular member.

12. The member as claimed in claim 1, wherein a greater pressure may be borne from the first wall than from the second wall.

13. The member as claimed in claim 1, wherein the first wall is a radially outer wall of the tubular.

14. The member as claimed in claim 1, wherein the first wall is a radially inner wall of the tubular.

15. The member as claimed in claim 1, wherein a plurality of groups of fixed supports and dual-action supports are spaced along a longitudinal direction of the tubular member.

16. The member as claimed in claim 15, wherein each group of the plurality of groups has the same orientation.

17. The member as claimed in claim 15, wherein one or more groups of the plurality of groups has an orientation that is opposite one or more other groups of the plurality of groups.

18. A method for maintaining standard tubular dimensions while achieving asymmetric burst and collapse ratings comprising:
exposing the tubular member as claimed in claim 1 to pressure from one of the first or second walls; and
supporting or failing to support the tubular member depending upon an orientation of the support and the dual-action support.

19. The method as claimed in claim 18 wherein when pressure is applied to the first or second wall on which the dual-action support is located, the method includes flexing the wall and causing the dual-action support to splay, thereby misaligning the dual-action support with the fixed support.

20. A borehole system, comprising:
a borehole in a subsurface formation;
a string in the borehole; and
a tubular member with asymmetric burst and collapse ratings as claimed in claim 1 disposed within or as a part of the string.

* * * * *